United States Patent
Vita et al.

(10) Patent No.: US 12,429,027 B2
(45) Date of Patent: Sep. 30, 2025

(54) METHODS FOR OPERATING WIND TURBINES AND FEEDING AUXILIARY SYSTEMS

(71) Applicant: General Electric Renovables Espana, S.L., Barcelona (ES)

(72) Inventors: Luca Vita, Barcelona (ES); Benjamin Palethorpe, Nantes (FR); Marc Sala Lluma, Barcelona (ES)

(73) Assignee: GE Vernova Renovables Espana, S.L., Barcelona (ES)

(*) Notice: Subject to any disclaimer, the term of this patent is extended or adjusted under 35 U.S.C. 154(b) by 121 days.

(21) Appl. No.: 18/176,593

(22) Filed: Mar. 1, 2023

(65) Prior Publication Data
US 2023/0279837 A1 Sep. 7, 2023

(30) Foreign Application Priority Data
Mar. 2, 2022 (ES) .................................. 22382188.5

(51) Int. Cl.
*F03D 7/00* (2006.01)
*F03D 7/02* (2006.01)
*F03D 7/04* (2006.01)

(52) U.S. Cl.
CPC .......... *F03D 7/0276* (2013.01); *F03D 7/0224* (2013.01); *F03D 7/044* (2013.01); *F05B 2270/101* (2013.01)

(58) Field of Classification Search
CPC ...... F03D 7/0276; F03D 7/0224; F03D 7/044; F03D 80/003; F03D 7/0284; F03D 9/25; F03D 7/028; F03D 13/20; F03D 15/00; F03D 17/00; F03D 7/042; F05B 2270/101; F05B 2260/42; F05B 2260/96;
(Continued)

(56) References Cited

U.S. PATENT DOCUMENTS 9,698,715 B2 7/2017 Bodewes
10,662,924 B2 5/2020 Caponetti et al.
(Continued)

FOREIGN PATENT DOCUMENTS

| EP | 2565443 A1 | 3/2013 |
| EP | 3071831 A1 | 9/2016 |
| WO | WO2015074664 A1 | 5/2015 |

OTHER PUBLICATIONS

European Search Report Corresponding to EP22382188 on Aug. 2, 2022.

*Primary Examiner* — Julio C. Gonzalez
(74) *Attorney, Agent, or Firm* — Dority & Manning, P.A.

(57) ABSTRACT

The present disclosure relates to methods for operating wind turbines (10), in particular to methods for feeding wind turbine auxiliary systems when connection to the electrical grid (102) is lost. A method (100) comprises rotating a wind turbine rotor (18) at a first rotational speed by actively controlling a pitch angle of the plurality of rotor blades (22) while a safe condition is detected, and generating electric power; supplying at least part of the generated electric power to at least one wind turbine auxiliary system; detecting a specified condition; and in reply to the detection of the specified condition, rotating the wind turbine rotor (18) at a second rotational speed lower than the first rotational speed, and generating electric power.

12 Claims, 5 Drawing Sheets

(58) Field of Classification Search
CPC .......... F05B 2270/327; F05B 2270/335; F05B 2270/337; F05B 2270/706; Y02E 10/72
See application file for complete search history.

(56) References Cited

U.S. PATENT DOCUMENTS

| | | | |
|---|---|---|---|
| 2014/0167416 A1* | 6/2014 | Perley | H02P 9/04 |
| | | | 290/44 |
| 2016/0258416 A1* | 9/2016 | Hammerum | F03D 7/024 |
| 2016/0305402 A1* | 10/2016 | Caponetti | F03D 7/0224 |
| 2020/0166017 A1* | 5/2020 | Hansen | F03D 7/0224 |
| 2021/0285419 A1 | 9/2021 | Warfen et al. | |

* cited by examiner

METHODS FOR OPERATING WIND TURBINES AND FEEDING AUXILIARY SYSTEMS

The present disclosure relates to methods for operating wind turbines, in particular to methods for providing auxiliary power to one or more wind turbine auxiliary systems when connection to the electrical grid is lost. The present disclosure further relates to wind turbines.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that may contain and protect the gearbox (if present) and the generator (if not placed outside the nacelle) and, depending on the wind turbine, further components such as a power converter, and auxiliary systems.

A wind turbine generally comprises electrical systems such as pitch control systems, ventilation and temperature regulation systems, communication systems, oil pump systems and others which require electric power for operating. The power for operating these systems may be obtained from the electrical grid or from the wind turbine generator.

If the wind turbine is for any reason prevented from obtaining power from the electrical grid, some of the electrical systems of the wind turbine may stop working. For extending the operation of at least some electrical systems of the wind turbine when the grid is unavailable, one or more energy storage and/or energy supply devices may be provided. For example, a battery-based system, supercapacitors such as uninterruptible power supplies (UPSs), or one or more diesel generators may be provided.

If one or more wind turbines of a wind farm become disconnected from the electrical grid, the disconnected wind turbines may be configured to enter a so-called island mode. While a wind turbine is in island mode, some relevant wind turbine electrical systems, e.g. communication systems and ventilation systems, may keep operating until electric power provided by auxiliary power sources runs out as well.

While disconnected from the grid, and in order to protect the wind turbines from excessive loads which may damage the wind turbine, the wind turbines are generally idled. I.e., the wind turbine blades may be positioned e.g. at a feathered position of about 90° with respect to the rotor plane for slowly rotating e.g. at 1 RPM. A wind turbine may be in such an island mode until grid connection is regained, provided that an amount of auxiliary power available is actually sufficient for restarting normal operation.

In order to keep critical auxiliary systems operative for longer periods of time, a large number of power supply/storage devices and/or relatively large energy supply/storage devices may be required. It is known for example to provide diesel generators or solar panels to provide power for a prolonged period of time. In addition, if the size and/or number of auxiliary power sources is still not sufficient, for example for supplying electric power during several days or weeks, going to the wind turbine site and recharging/refueling e.g. diesel generators may be necessary. This may particularly be time consuming and costly for offshore wind turbines.

The present disclosure aims to provide improvements in having a sufficient and suitable supply of auxiliary power available when needed and for longer periods of time.

SUMMARY

In an aspect of the present disclosure, a method for operating a wind turbine is provided. The wind turbine comprises a wind turbine rotor including a plurality of blades and a wind turbine generator. The method comprises rotating the wind turbine rotor at a first rotational speed by actively controlling a pitch angle of the plurality of blades while a safe condition is detected and generating electric power. The method further comprises supplying at least part of the generated electric power to at least one wind turbine auxiliary system. The method further comprises detecting a specified condition, and in reply to the detection of the specified condition, rotating the wind turbine rotor at a second rotational speed which is lower than the first rotational speed and generating electric power.

According to this aspect, if a certain safe condition for the wind turbine is detected in an autonomous mode of operation, the speed of the rotor is maintained at a suitable level for generating power for one or more auxiliary systems. And if a certain specified condition for the wind turbine is detected, the speed of the rotor is maintained at a lower rotational speed to avoid excessive loads in the wind turbine.

In this way, the wind turbine may rotate smoothly and without interruptions. For example, stall may be avoided by transitioning to a lower speed of rotation. Also, the relevant electrical systems in the wind turbine may be kept operative for a longer period of time while reducing the risk of damage to the wind turbine. In addition, less auxiliary power sources may be required in a wind turbine or wind farm, and/or a size of the auxiliary power sources may be reduced.

Throughout this disclosure, a safe or a specified condition may be understood as a condition that a wind turbine may detect, e.g. by measuring one or more parameters such as wind speed, loads, vibrations and more. While a safe condition is detected, the wind turbine may rotate smoothly in the autonomous mode of operation and risk of damage may be sufficiently low. The detection of a specified condition serves as a trigger for reducing the speed of rotation of the rotor. In some examples, a specified condition for idling operation may be related to an excessive risk of damage to the wind turbine. In other examples, other situations which trigger the reduction of the rotor speed may be detected. For instance, an excessive risk of stall or a fault in the wind turbine may be deemed to be specified conditions.

Throughout this disclosure, auxiliary systems may refer to wind turbine systems or devices which should still be powered or are preferably also powered if the electrical grid is not available. For example, it may be necessary to maintain the communications systems and the temperature regulation and ventilation systems of the wind turbine in operation when the grid is unavailable.

Throughout this disclosure, a pitch angle of a wind turbine blade may be understood as an angle that may be measured, in cross-section, between a reference line and a chord of the blade. The reference line may be substantially parallel, e.g. included, in a wind turbine rotor plane in some examples.

Throughout this disclosure, it may be understood that a wind turbine is in operation ("normal operation") when its rotor is rotating at a speed that is high enough to produce power, the electrical grid is available, and the generator of the wind turbine is producing electric power which is transferred into the electrical grid. The term "normal operation" may be used herein to explicitly refer to such a situation and explicitly differentiate it from operation of a wind turbine in for example an autonomous mode.

Throughout this disclosure, the term "autonomous mode of operation" may refer to a mode of operation of a wind turbine in which the wind turbine is not supplying or obtaining electric power from the grid and the wind turbine is configured to operate independently from the electrical grid operation. In this mode, electric power may be obtained from auxiliary power sources for keeping wind turbine critical electric systems, e.g. one or more of communication systems, temperature and ventilation regulation systems, bearing lubrication systems, controller systems and navigation lights, operative. The terms auxiliary power source(s), auxiliary energy storage device(s) and auxiliary energy storage system(s) may be used interchangeably herein. An "island mode" is an example of such an autonomous mode of operation.

When reference is made throughout this disclosure to the fact that a wind turbine is (electrically) disconnected from the grid, it may be understood that a wind turbine is not supplying or obtaining electric power to/from the grid. It may refer to a condition in which the wind turbine is electrically disconnected from the grid, either because a circuit breaker is opened or otherwise. It may refer to a condition in which the wind turbine has not operated yet, e.g. during erection or commissioning of a wind farm. It may also refer to a condition in which no grid is available, for example during installation and commissioning of a wind farm, no grid may even exist yet.

In a further aspect of the present disclosure, a method for operating a wind turbine when the wind turbine is unable to receive electric power from the electrical grid is provided. The wind turbine comprises a rotor including a plurality of blades and a generator. The method comprises, when a wind speed is below a wind speed threshold, rotating the wind turbine rotor at a first speed by actively pitching the plurality of blades such that electric power is generated by the generator and is supplied to one or more wind turbine auxiliary components. The method further comprises, when the wind speed is at or above the wind speed threshold, decreasing the speed of rotation of the rotor to a second speed of rotation. The method further comprises keeping the second speed of rotation by actively controlling the pitch angle such that electric power is generated by the generator and is supplied to one or more wind turbine auxiliary components.

In yet a further aspect of the present disclosure, a wind turbine is provided, which includes a control system configured to carry out the herein described methods.

DETAILED DESCRIPTION OF EXAMPLES

Reference now will be made in detail to embodiments of the present disclosure, one or more examples of which are illustrated in the drawings. Each example is provided by way of explanation only, not as a limitation. In fact, it will be apparent to those skilled in the art that various modifications and variations can be made in the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Figure 1:
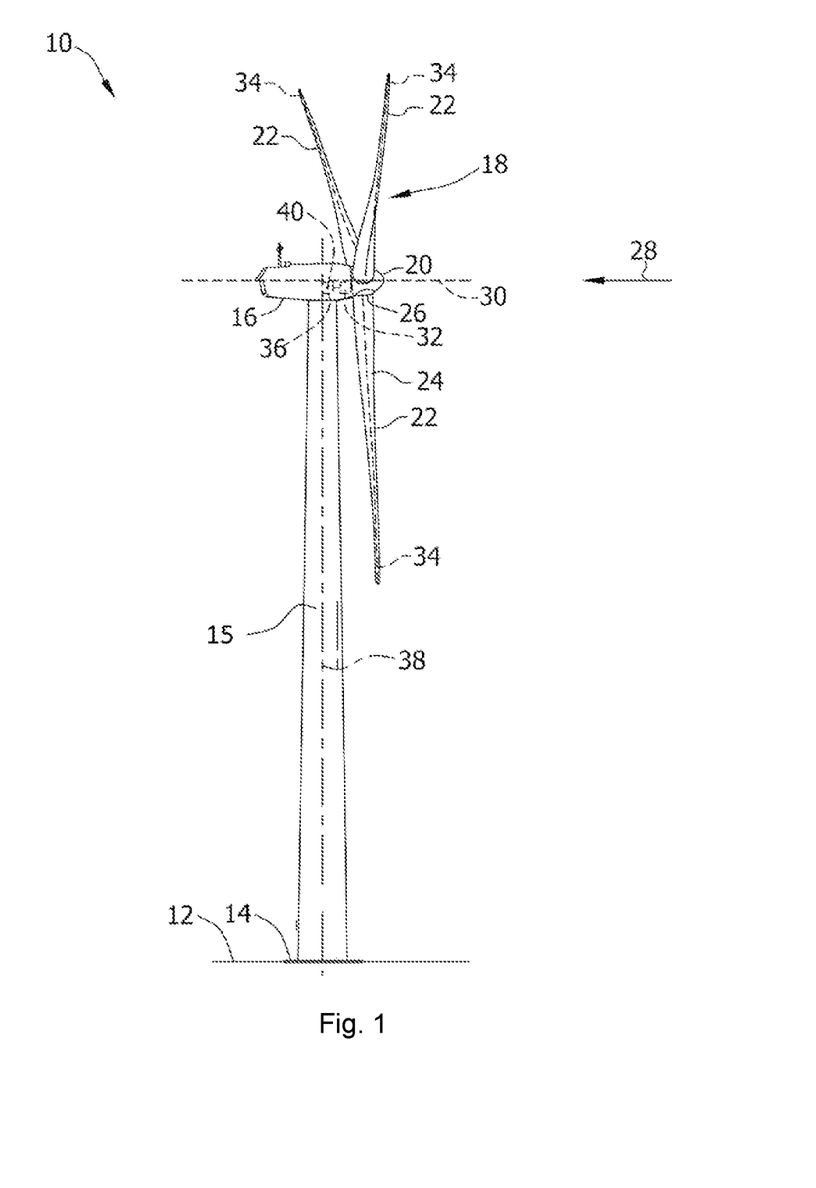
FIG. 1 illustrates a perspective view of one example of a wind turbine.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root region 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, e.g. an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed control system throughout the wind turbine 10, on the support system 14, within a wind farm, and/or at a remote-control center. The wind turbine controller 36 may include one or more processors configured to perform one or more of the steps of the methods described herein. Further, many of the other components described herein include one or more processors. The wind turbine controller 36 may also include a memory, e.g. one or more memory devices. As used herein, a memory may comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements.

Figure 2:
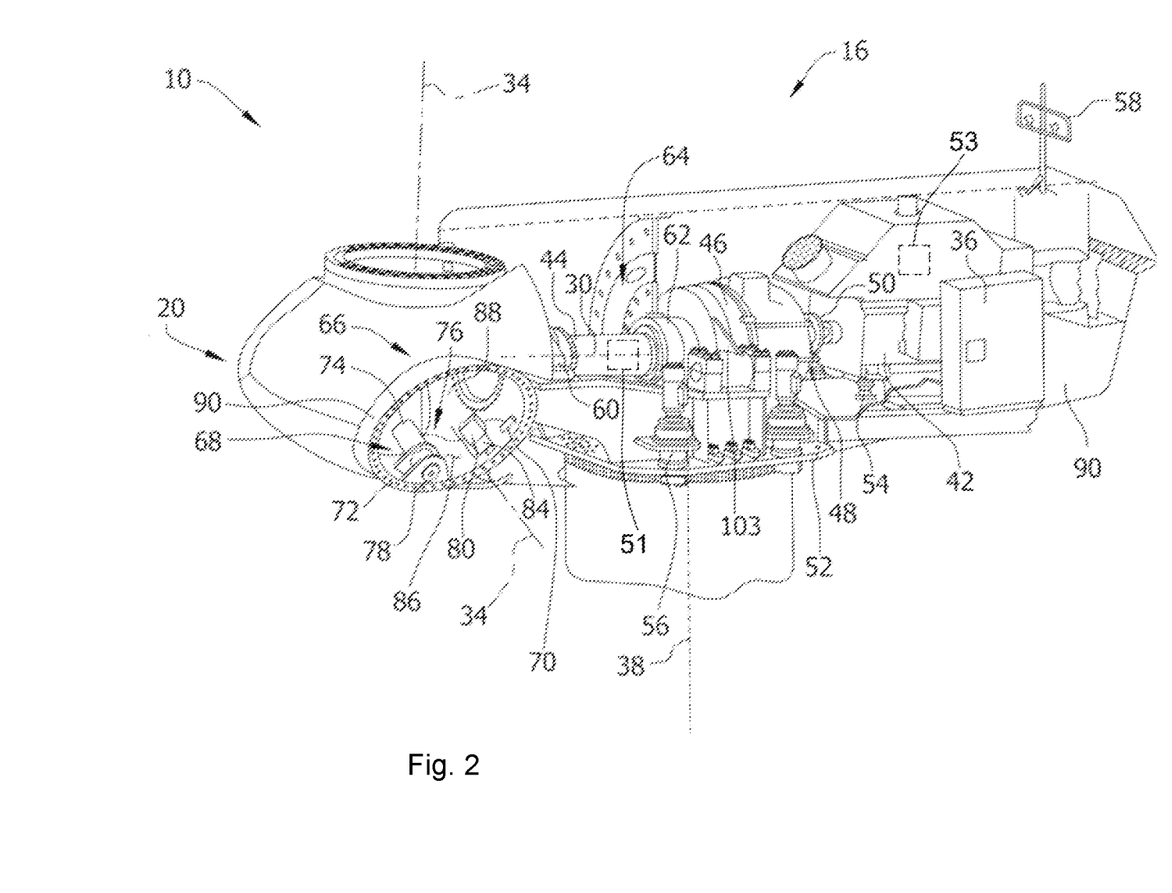
FIG. 2 illustrates a simplified, internal view of one example of the nacelle of the wind turbine of the FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between e.g. 400V to 1000 V into electrical energy having medium voltage (e.g. 10-35 KV). Offshore wind turbines may have for example generator voltages between 650 V and 3500 V, and transformer voltages may for instance be between 30 kV and 70 kV. Said electrical energy is conducted via power cables from the nacelle 16 into the tower 15.

In some examples, the wind turbine 10 may include one or more shaft sensors 51. The shaft sensors may be configured to monitor at least one of torque loads acting on the main shaft 44 and/or the high-speed shaft 48, and a rotational speed of the shaft 44, 48. In some examples, the wind turbine 10 may include one or more generator sensors 53. The generator sensors may be configured to monitor at least one of a rotational speed of the generator 42 and a generator torque. Shaft sensors 51 and/or generator sensors 53 may include, for instance, one or more torque sensors (e.g., strain gauges or pressure sensors), optical sensors, accelerometers, magnetic sensors, speed sensors and Micro-Inertial Measurement Units (MIMUs).

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operates at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 may also include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and an anemometer. The meteorological measurement system 58 can provide information to the wind turbine controller 36 that may include wind direction 28 and/or wind speed.

In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electric power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power source 84 provides power to the pitch assembly 66 only during an electric power loss event of the wind turbine 10. The electric power loss event may include power grid loss or dip, malfunctioning of an electrical system of the wind turbine 10, and/or failure of the wind turbine controller 36. During the electric power loss event, the power generator 84 operates to provide electric power to the pitch assembly 66 such that pitch assembly 66 can operate during the electric power loss event.

In the example, the pitch drive system 68, the sensor 70, the pitch control system 80, cables, and the power source 84 are each positioned in a cavity 86 defined by an inner surface 88 of hub 20. In an alternative embodiment, said components are positioned with respect to an outer surface of hub 20 and may be coupled, directly or indirectly, to the outer surface.

As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein.

In an aspect of the present disclosure, a method 100 for operating a wind turbine 10 in an autonomous mode of operation is provided. The wind turbine 10 comprises a wind turbine rotor 18 including a plurality of blades 22 and a wind turbine generator 42, as illustrated in FIGS. 1 and 2 for example. The wind turbine 10 is configured to supply electric power from the generator 42 to at least one of: one or more wind turbine auxiliary systems 108 and one or more auxiliary power sources 84 in the autonomous mode. The method 100 is schematically shown in the flow chart of FIG. 3. One or more auxiliary systems 108 may be in the same wind turbine 10 that generates the power, or may be in a different wind turbine.

Figure 3:
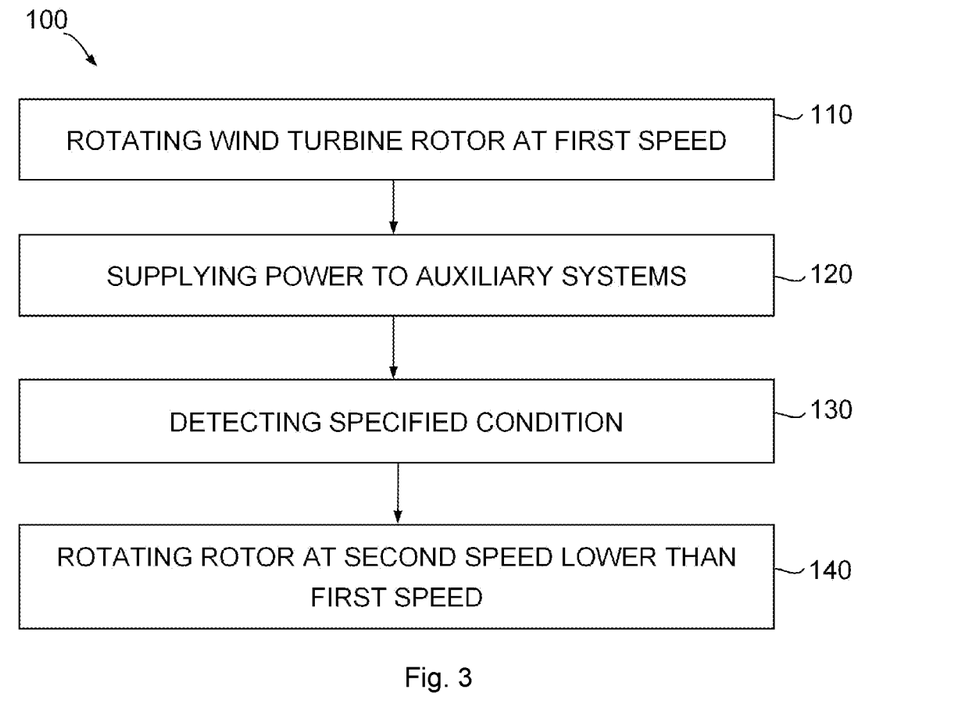
FIG. 3 shows a flow chart of an example of a method for operating a wind turbine.

The method comprises, at block 110, rotating the wind turbine rotor 18 at a first rotational speed by actively controlling a pitch angle 25 of the plurality of blades 22 while a safe condition is detected and generating electric power. The method further comprises, at block 120, supplying at least part of the generated electric power (while rotating the rotor at the first speed) to at least one wind turbine auxiliary system 108. The method further comprises, at block 130, detecting a specified condition, and, at block 140, in reply to the detection of the specified condition, rotating the wind turbine rotor 18 at a second rotational speed lower than the first rotational speed and generating electric power. The method may further comprise, in some examples, supplying at least part of the generated electric power, while the rotor rotates at the second speed, to at least one wind turbine auxiliary system 108.

Therefore, the wind turbine rotor 18 may be rotating in an autonomous mode of operation at a certain rotational speed and the wind turbine generator 42 may be generating power for feeding auxiliary systems, e.g. of the wind turbine, such as temperature regulation systems and communication systems. The rotational speed, and therefore the generated electrical power, may be kept at a desired value by actively controlling the pitch angle 25 of the blades 22. The generator 42 torque can also be controlled, e.g. with a main converter or an additional converter.

When a condition which may endanger the wind turbine 10 is detected, for example if excessive vibrations are detected, the wind turbine rotor 18 is slowed down and the rotor 18 is rotated at a lower rotational speed for avoiding excessive loads. The wind turbine may continue to generate and supply electric power to one or more auxiliary systems of the wind turbine 10. The pitch angle of the blades 22 may also be actively controlled while rotating the rotor at this lower rotational speed to maintain the new, lower, speed of rotation of the rotor 18 and optionally the power output.

A power output may be obtained for feeding auxiliary systems, and possibly auxiliary energy storage systems, during an autonomous mode of operation when conditions are favorable, e.g. at low wind speeds, as well as when conditions become less favorable, e.g. at high wind speeds or at high angles of attack. Instead of stop generating power in unsafe conditions during the autonomous mode of operation, the speed of rotation of the rotor, possibly the pitch angle of the blades, and possibly the generator torque, are adapted for generating power and supplying it to the auxiliary systems. Such adaptations may also facilitate regulating the power output and keeping it as constant as possible. In addition, as the availability of power generated by the generator is extended, the number and/or size of energy storage sources, e.g. batteries, ultracapacitors, UPS or diesel generators may be reduced in comparison with a wind turbine 10 which is not able to perform method 100.

Figure 4A:
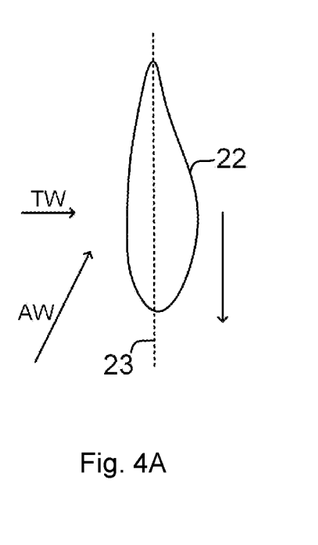
FIGS. 4A, 4B and 4C schematically illustrate different pitch angles of a wind turbine blade according to an example.
Figure 4B:
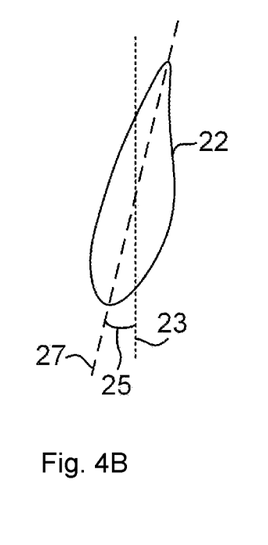
Figure 4C:
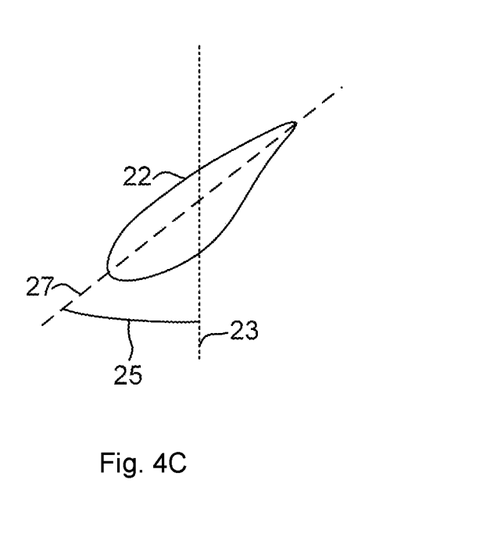

Throughout this disclosure, a pitch angle of a wind turbine blade 22 may be understood as an angle 25 that may be measured, in cross-section, between a reference line 23 and a chord of the blade 27, see FIGS. 4A, 4B and 4C. The reference line 23, indicated as a dotted line in FIGS. 4A, 4B and 4C, may be substantially parallel to a rotor plane of a wind turbine 10. FIGS. 4A, 4B and 4C schematically illustrate a blade 22 in cross-section. The wind, see arrow "TW", may blow from left to right in these figures. The wind turbine blade 22 rotates in the rotor 18 plane and moves, in this figure, in a downwards direction, resulting in an apparent wind flow, see arrow "AW" upwards. The apparent wind AW is composed of the wind caused by the rotation of the blade and the wind blowing against the blades 22 in an axial direction TW. The right hand side of the profiles shown in FIGS. 4A, 4B and 4C may be understood to be the suction side of the blade, whereas the left hand side may be understood to be the pressure side of the blade.

In FIG. 4A, the blade is in a reference position for the pitch angle 25. In the reference position, a chord 27 of the blade is substantially parallel to the reference line 23. In FIG. 4A, a chord 27 of the blade and the reference line 23 overlap. The pitch angle 25 may therefore be 0° or a "default pitch angle". The default pitch angle, or "reference position" may be a position that the wind turbine blade 22 will maintain over a range of low wind speeds, e.g. of sub-nominal wind speeds.

In FIG. 4B, the blade has been pitched away from the reference position. A pitch angle 25 in FIG. 4B is therefore higher in FIG. 4B than in FIG. 4A. In FIG. 4C, the pitch angle 25 has been further increased with respect to the reference position. Increasing the pitch angle 25 may generally slow down the wind turbine rotor i.e. the wind turbine blade is set in a position in which it is configured to generate less lift and more drag to reduce the aerodynamic torque of the wind turbine rotor. Pitching the blades 22 to about 90° from the reference position may put the wind turbine in a feathered position and possibly completely stop it or at least greatly reduce its rotational speed. The feathered position of the blades is the position in which the blades may be placed when the wind turbine is parked e.g. for maintenance.

In some examples, the safe condition may be detected when a predetermined parameter is below a threshold, and the specified condition may be detected when the predetermined parameter has reached or exceeded the threshold. If a specified condition is determined and the wind turbine does not act, it may be damaged. For avoiding damage, the speed of rotation of the rotor 18 is reduced. In order to check that the rotor is rotating at a desired speed, a shaft sensor 51 or a generator sensor 51 may be used.

In some examples, detecting a safe condition and/or a specified condition may include measuring at least one of: wind speed, angle of attack, wind turbine load, wind turbine vibration and wind turbine acceleration. I.e., the predetermined parameter may be one of wind speed, angle of attack, wind turbine load, wind turbine vibration and wind turbine acceleration. Measurements may be both direct and indirect. More than one parameter may be monitored at a same time. For instance, a wind speed threshold may separate a low wind speed region from a high wind speed region. If a certain predetermined value indicative of a high wind speed is detected, e.g. 20 m/s, 25 m/s, 30 m/s or more, the rotational speed of the rotor may be decreased and kept at a lower value. Wind speed may be determined by a meteorological measurement system 58, e.g. a wind anemometer. Wind speed may also be derived from a rotor speed, optionally in combination with a pitch angle.

Wind turbine loads may include at least one of forces, stresses and pressures. A shaft sensor 51 may be used for determining wind turbine loads and vibrations. In general, different types of sensors arranged at different wind turbine locations, such as bearings and or roots of blades, known in the art may be used to measure the relevant parameters.

Figure 5:
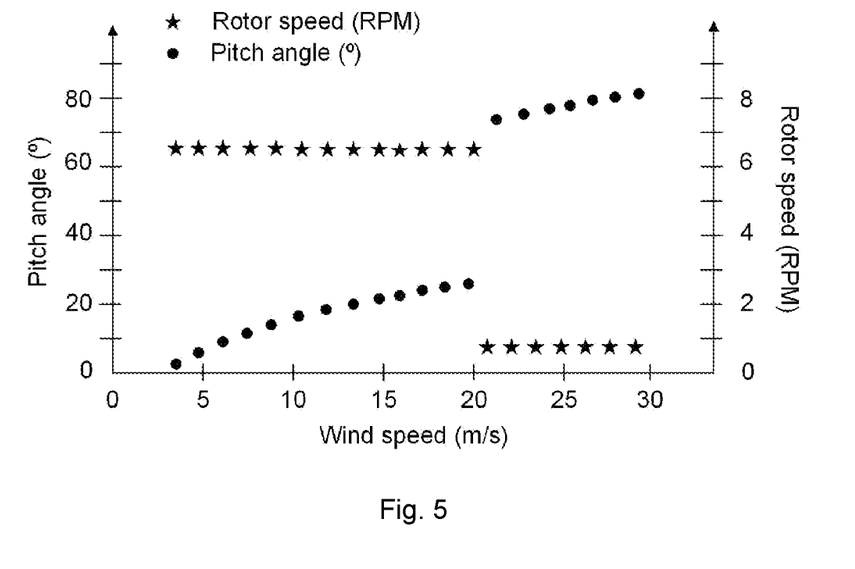
FIG. 5 schematically illustrates an example of the evolution of a rotational speed of the rotor and the pitch angle of the blades for low and high wind speeds.

FIG. 5 schematically shows an example of the evolution of pitch angle of the blades and rotational speed of the rotor with wind speed during autonomous operation of a wind turbine. In this example, the threshold is a wind speed, in particular of 20 m/s. Below this wind speed, pitch may be actively controlled to provide a substantially constant rotational speed, which in this example is between 6 and 7 RPM, e.g. of about 6.5 RPM. In other examples, the rotational speed may slightly vary, e.g. between 5 and 7 RPM.

The pitch angle 25 may be varied using a PID control. In some examples, the pitch angle may be varied, when the rotor 18 is rotated at the first and/or at the second rotational speed, with a proportional gain of a PID control lower than a proportional gain of a PID control used during normal wind turbine operation. In the example of FIG. 5, variation of wind speed does not have a large effect on pitch variation. Control of power output may be easier with a relatively low proportional gain of a PID control. Pitch variation may be relatively small and may not change abruptly with wind speed. Above 20 m/s, the rotational speed of the rotor is decreased below 1 RPM in this example, e.g. to about 0.8 RPM, and kept at this speed. In examples, pitch angles of the blades are again actively controlled to maintain such rotor speed. In the example of this figure, the generator may generate for instance 200 kW, both below the wind speed threshold, and above the wind speed threshold. The first and/or second rotational speeds of the rotor may, in this and in other examples, be different from rotational speed(s) of the rotor during normal operation of the wind turbine.

In some examples, the first speed of rotation of the rotor may be such that a rotation frequency of the rotor, namely the 1P rotor frequency, (and therefore also 3P rotor frequency) is above a natural frequency of the wind turbine tower. 1P is the first excitation frequency, which is the (constant) rotational speed of the rotor. 3P is the second excitation frequency (for a wind turbine with three blades), which is the blade passing in front of the tower. 3P is then 3 times the rotation frequency of the rotor 18 for a wind turbine with three blades. If the 1P and 3P frequencies are above the natural frequency of the tower, tower vibration may be avoided or at least not enhanced. For example, 3P tower resonance, i.e. a coincidence between the blade passage frequency and the tower natural frequency, would not occur. The amplitude of tower vibration, and therefore in general of the wind turbine, may be restricted.

In these or other examples, the second speed of rotation of the rotor may be such that the rotation frequency of the rotor, namely the 1P rotor frequency, is below a natural frequency of the wind turbine tower. Therefore, tower resonance may be avoided and risk of damage to the wind turbine may be reduced. Also, a substantially constant power output, or at least a power output within admissible limits, may be more easily obtained in less favorable conditions such as high winds, e.g. above 20 or 25 m/s. Risks or problems with respect to blade stall and wind turbine stability may also be avoided, or at least reduced. In some examples, the 3P rotor frequency may also be below the natural frequency of the wind turbine tower.

In the example of FIG. 5, the 6.5 RPM below 20 m/s may e.g. correspond to a rotation frequency of the rotor (1P frequency) which is above the natural frequency of the tower. And the 0.8 RPM above 20 m/s may e.g. correspond to a rotation frequency of the rotor (1P frequency) which is below the natural frequency of the tower. In some examples, a rotational speed of the rotor between 3 RPM and 6 RPM, e.g. between 3 and 5 or between 3 and 4 RPM, may cause the tower to vibrate at a natural frequency. In other examples, other ranges of rotor speed, which may not overlap with the previous ones, or which may partially overlap with them, may cause the tower to oscillate at a natural frequency. For instance, a rotor speed between 2.8 and 3.5 RPM may cause the tower to oscillate at a natural frequency. In the example of FIG. 5, a rotational speed between 3 and 3.5 RPM may cause the tower to vibrate at its natural frequency.

Depending on the natural frequency of the tower, the first and second rotational speeds may be adapted. A good balance between power generation and reduction of loads acting on the wind turbine may be obtained. In some examples, the first rotational speed may be between 4 and 8 RPM, specifically between 5 and 7 RPM. In these or other examples, the second rotational speed may be below 4 RPM, specifically below 3 RPM, more specifically below 2 RPM, and more specifically below 1 RPM. For instance, in some examples the first rotational speed may be between 5.5 and 6.5 RPM, and the second rotational speed may be below 2.5 RPM, e.g. between 1.5 and 2.3 RPM.

In some examples, for instance in the example of FIG. 5, the pitch angle 25 of the blades 22 may be kept below 45° when the wind turbine rotor 18 is rotated at the first rotational speed, in particular below 30°. The pitch angle may be kept above 45° when the wind turbine rotor 18 is rotated at the second rotational speed, in particular above 60°. These ranges of pitch angle may help to generate a suitable amount of power as well as to minimize vibrations and stall. In other examples, pitch angles within other ranges, either non-overlapping or partially overlapping with the already mentioned ranges, may be deemed suitable for operation in each of the safe and dangerous regimes.

In some examples, the power generated when rotating the rotor at the first and/or at the second rotational speed may be less than 5%, specifically less than 3%, and more specifically less than 1% of the rated power of the wind turbine. For instance, if the wind turbine has a rated power of 12 or 14 MW, the generator 42 may provide between 100 and 300 kW in the autonomous mode of operation. A power output as disclosed in this paragraph may be sufficient to feed all the necessary auxiliary systems, and in some examples also one or more auxiliary power systems.

The speed of rotation of the rotor may be substantially constant while a safe condition is detected, and may also be constant once the transition to a speed of rotation to be maintained when a specified condition for the wind turbine is detected has been achieved. The transition between those two speeds of rotation may be any suitable transition. I.e., the transition may be faster or slower, and the speed of rotation may vary in a linear or a different way. Torque supplied by the power converter may also vary in any suitable manner.

With respect to the first and second rotational speeds of the rotor, they may be substantially constant in examples. For example, the speed of rotation of the rotor when rotating the rotor at the first and/or at the second rotational speed may be maintained within a range of a setpoint of a speed of rotation of the rotor plus or minus a 10% of the setpoint, in particular within a range of a setpoint of speed of rotation of the rotor plus or minus a 5% of the setpoint. The main controller may indicate which is the setpoint of the rotational speed. In the example of FIG. 5, the setpoint during safe conditions for the wind turbine is of about 6.5 RPM, and the setpoint during specified conditions is of about 0.8 RPM. In other examples, the setpoints may be different.

Similarly, the power output may vary within certain limits. The power generated when rotating the rotor at the first and/or at the second rotational speed may be maintained within a range of a setpoint of power output plus or minus a 10% of the setpoint for example, specifically within a range of a setpoint of power output plus or minus a 5% of the setpoint. In the example of FIG. 5, the power setpoint may be of about 200 kW for both safe and specified conditions.

In some examples, a power output setpoint may be provided. In these examples, pitch angle and generator torque may be actively regulated for achieving and maintaining the power output setpoint. A rotational speed setpoint may be omitted. A same power output setpoint may be provided for all the autonomous operation mode, i.e. for both safe and specified conditions, or two different power output setpoints may be provided: a first one for safe conditions, and a second one for specified conditions. The second power output setpoint may be lower than the first power output setpoint. The speed of rotation of the rotor above and/or below the threshold may be maintained within a range of an average speed of rotation of the rotor plus or minus a 10% of the average speed of rotation of the rotor, in particular within a range of an average speed of rotation of the rotor plus or minus a 5% of the average speed of rotation of the rotor.

In other examples, a rotational speed setpoint may be provided. Generator torque and pitch angle may be varied for reaching and keeping such a setpoint. Two different setpoints for a speed of rotation of the rotor may be provided, a first one for safe conditions and a second one, lower than the first one, for specified conditions. The power output above and/or below the threshold may be maintained within a range of an average power output plus or minus a 10% of the average power output, in particular within a range of an average power output plus or minus a 5% of the average power output.

In some examples, besides feeding one or more auxiliary systems, generated electric power by the generator 42 may also be supplied to at least one auxiliary energy storage device 84. This may help to extend the operation of the wind turbine while grid connection is not available. One or more auxiliary energy storage systems 84 may be arranged in any suitable location with respect to the wind turbine 10. In some examples, one or more energy storage devices 84 may be placed within a nacelle 16. In FIG. 2, an auxiliary energy storage device 84 is shown for the pitch system 32 of a blade 22. It should be understood that such energy storage system may be placed in other locations in other examples, e.g. in the tower, at or near the base of the tower, in a transition piece and other. It should also be understood that further energy storage devices 84 may also be provided in the example of FIG. 2 or in other examples. An auxiliary power source 84 may also be arranged within a wind farm such that it may supply electric power to more than one wind turbine 10.

Both an onshore wind turbine and an offshore wind turbine may perform the method steps disclosed herein. If the wind turbine is an offshore wind turbine, the first and/or the second speeds of rotation of the rotor may be such that the rotation frequency of the rotor and three times the rotation frequency of the rotor, i.e. the 1P and 3P rotor frequencies, are different from a frequency of the sea waves striking the wind turbine. In such a case, the rotation of the rotor 18 may act as a damper and counteract the tower vibrations caused by the waves. Vibration and the risk of damage to the wind turbine may therefore be reduced.

If the detected specified condition stops being detected, and no other specified condition is detected, the wind turbine rotor may increase its rotational speed. For example, if in safe conditions the speed of rotation was of about 6.5 RPM and this speed was reduced while in unsafe conditions, the speed of rotation may be increased again to 6.5 RPM when danger has ended. If connection to the grid is gained, the speed of rotation may be further increased.

One or more of a specified condition, a power output and a speed of rotation for safe and specified conditions may be determined, identified or known before installing a wind turbine. In some examples, they may be determined before installing a wind turbine, or during installation or commissioning of the wind turbine. For instance, a power output and one or more thresholds may be set before the wind turbine is installed. In other examples, one or more conditions or parameters may be determined after the wind turbine has started normal operation. In some examples, a second rotational speed setpoint for unsafe conditions may even be determined during autonomous operation. For example, if during safe conditions while in autonomous operation it is detected, or it is known or suspected that a specified condition will be met in some time, e.g. hours or days, weather forecasts may be used to determine the second rotational speed threshold. A pitch angle 25 of the blades 22 and a generator torque for achieving that rotor speed may then be determined. Such a rotational speed setpoint may in some examples be received from a remote operating center.

In a further aspect of the disclosure, a method 200 for operating a wind turbine 10 when the wind turbine is unable to receive electric power from the electrical grid 102 is provided. This may e.g. be due to the fact that a physical connection between the wind turbine and the electrical grid 102 may be missing, e.g. because a busbar or some cables are damaged or broken. In other examples, a physical connection between the wind turbine and the electrical grid may be present, but other reasons, e.g. electrical faults, may prevent that the wind turbine obtains power from the grid 102. The wind turbine 10 comprises a rotor 18 including a plurality of blades 22 and a generator 42. The wind turbine 10 is configured to send electric power from the generator 42 to one or more wind turbine auxiliary components 108, and may also be configured to send it to one or more auxiliary power sources 84 at least in an autonomous mode of operation of the wind turbine. Method 200 is shown in the flow chart of FIG. 6. Aspects and explanations with respect to method 100 may be combined and applied to method 200 and vice versa.

Figure 6:
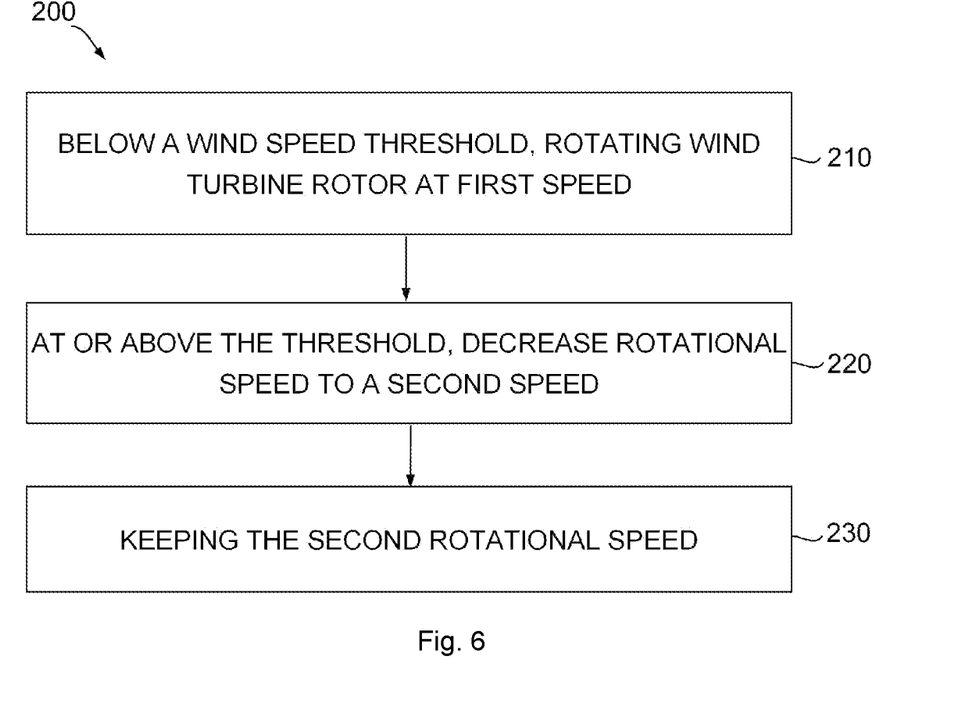
FIG. 6 shows a flow chart of another example of a method for operating a wind turbine.

The method comprises, at block 210, when a wind speed is below a wind speed threshold, rotating the wind turbine rotor 18 at a first speed by actively pitching the plurality of blades 22 such that electric power is generated by the generator and is supplied to one or more wind turbine auxiliary components 108. One or more auxiliary components 108 may be in the wind turbine 10 that generates the power, or in a different wind turbine.

The method further comprises, at block 220, when the wind speed is at or above the wind speed threshold, decreasing the speed of rotation of the rotor 18 to a second speed of rotation.

The method further comprises, at block 230, keeping the second speed of rotation by actively controlling the pitch angle such that electric power is generated by the generator 42 and is supplied to one or more wind turbine auxiliary components 108. Again, one or more auxiliary components 108 may be in a same or a different wind turbine.

In some examples, the wind speed threshold may be between 20 m/s and 30 m/s.

In some examples, an electric power supplied to one or more auxiliary components 108 may be below 500 kW, for instance between 100 and 400 kW.

In some examples, the first rotational speed may be between 5 and 8 RPM, and the second rotational speed may be below 3 RPM.

In some examples, the method may further comprise supplying electric power to one or more auxiliary energy storage systems 84, e.g. at least during rotation at the first rotational speed of the rotor 18.

In a further aspect of the disclosure, a wind turbine 10 configured to perform any of the methods 100, 200 disclosed herein is provided. The wind turbine 10 comprises a rotor 18 including a plurality of blades 22, a generator 42, and optionally one or more auxiliary power sources 84. The wind turbine is configured to supply electric power from the generator 42 to one or more auxiliary systems 108, and optionally also to one or more auxiliary energy storage systems 84 at least in an autonomous mode of operation of the wind turbine. The wind turbine 10 may be an onshore wind turbine or an offshore wind turbine. The wind turbine 10 comprises a control system configured to carry out any of the methods hereinbefore described.

Figure 7:
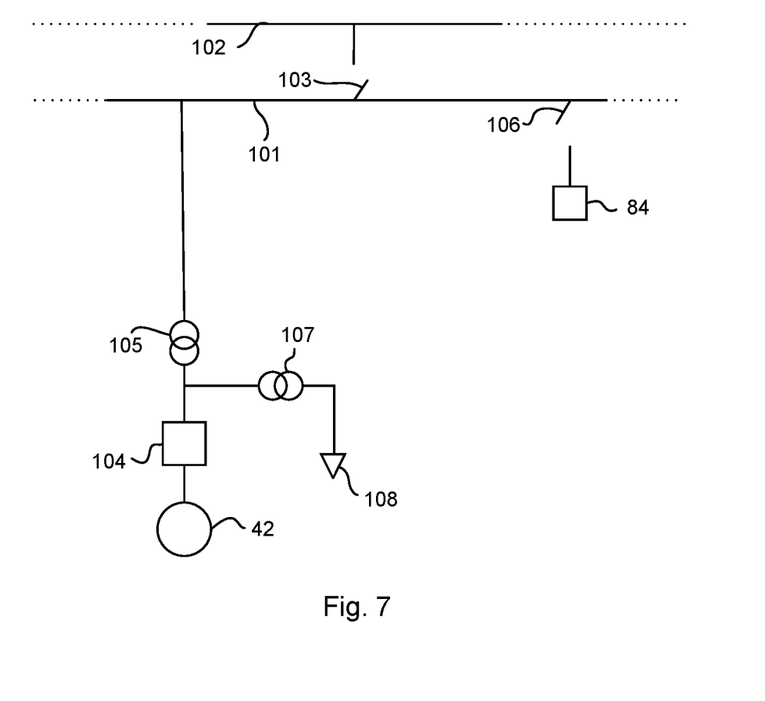
FIG. 7 schematically illustrates a wind turbine connected to an electrical grid and to one or more auxiliary power sources.

FIG. 7 schematically illustrates an example of a wind turbine 10 of a wind farm, e.g. an offshore wind turbine, in which methods 100 and 200 may be implemented. The wind turbine 10 is connected to a wind farm busbar 101, and then connected to the electrical grid 102 by a first switch 103. All the wind turbines of the wind park (not shown) are connected to the busbar 101 of the wind farm. The connection between the electrical grid 102 and the wind farm busbar 101 is regulated by the first switch 103.

The generator 42 of the wind turbine produces AC (alternating current) power of variable frequency due to varying wind conditions. A power converter 104 may be provided for adjusting the power output from the generator 42 to one suitable for the grid 102, e.g. to an AC power having fixed frequency. The power converter 104 may comprise a machine-side converter, a line-side converter and a DC (direct current) link connecting the machine-side and the line-side converter (not shown). In some examples, an additional auxiliary power converter (not shown) may be provided. Instead of the main power converter, the auxiliary power converter may be in charge of regulating generator torque during autonomous operation.

The generator 42 of the wind turbine may be a permanent magnet generator comprising a generator rotor carrying a plurality of permanent magnets and a stator in some examples. The permanent magnet generator may be directly driven by the wind turbine rotor 18. The stator of the generator may be connected to the machine-side converter, which may be configured to convert the received AC voltage to DC voltage, the DC voltage then being delivered to the DC-link. The line-side converter may be configured to convert the DC voltage from the DC-link into a fixed frequency AC voltage.

The line-side converter may be connected to the wind farm busbar 101 through a main transformer 105. The main transformer 105 may be configured to step-up the voltage delivered by the power converter 104, e.g. to 3.3 kV. The main transformer 105 may be installed within the nacelle 16 or the tower 15 of the wind turbine in some examples. The main transformer 105 may be arranged at other suitable places in other examples.

The wind turbine may also include an auxiliary transformer 107 configured to provide a source of low-voltage power, e.g. about 400 V, to some electric elements of the wind turbine. The auxiliary transformer 107 may for example supply power to the auxiliary electric systems 108 of the wind turbine such as ventilation and temperature regulation systems. The auxiliary transformer 107 may be housed within the nacelle 16 of the wind turbine and may be connected to the main transformer 105.

Wind farms may comprise a substation including e.g. wind farm transformers that convert power from a wind farm voltage to a grid voltage. In some examples, an auxiliary transformer 107 may also be arranged at a substation. The auxiliary transformer 107 may accordingly supply auxiliary power to a plurality of wind turbines. The auxiliary transformer 107 may in general be placed at any suitable location within a wind farm.

One or more auxiliary power sources 84 may be connected to the wind farm busbar 101 through a second switch 106, as in the example of FIG. 7. One or more auxiliary power sources 84 may be provided at a wind farm substation in some examples. Therefore, auxiliary power may be supplied to a plurality of wind turbines simultaneously. In other examples, one or more auxiliary power sources 84 may be installed near or within individual wind turbines for supplying power to each wind turbine individually. One or more auxiliary power sources for supplying auxiliary power to a single wind turbine as well as one or more auxiliary power sources for supplying auxiliary power to two or more wind turbines may also be provided. In general, any suitable number and location of auxiliary energy storage systems 84 may be chosen.

In the example of FIG. 7, the main transformer 105 may be configured to receive electric power from the electrical grid 102 at a first voltage and electric power from one or more auxiliary power sources 84 at a second voltage different from the first voltage, e.g. lower than the first voltage. The electrical grid 102 may be configured to provide electric power to the wind farm busbar 101 in normal operation, and the generator 42 and the auxiliary power source(s) 84 may be configured to provide electric power to the busbar 101 e.g. in case of grid loss.

If the wind turbine can no longer receive power from the electrical grid 102, the auxiliary systems 108 may start to obtain it from the generator 42 and/or one or more auxiliary power sources 84. Critical electric components 108 of a wind turbine 10 may therefore be powered through the auxiliary transformer 107 of the wind turbine. The auxiliary wind turbine transformer 107 may transform the power received from the main transformer 105 of the wind turbine to a voltage level required by the electric components of the wind turbine it feeds, e.g. from 3.3 kV to 0.3 kV. If the power provided by the generator 42 exceeds the power required by the auxiliary systems 108, the auxiliary power sources 84 may also be charged.

The above explanation may be adapted to the number and position of main transformers 105, auxiliary transformers 107, auxiliary systems 108, auxiliary energy storage systems 84, voltage levels and the number of wind turbines 10 from/to which they withdraw/send electric power.

This written description uses examples to disclose a teaching, including the preferred embodiments, and also to enable any person skilled in the art to put the teaching into practice, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for operating a wind turbine in an autonomous mode of operation, the wind turbine having a wind turbine rotor including a plurality of blades and a wind turbine generator, the method comprising:
   operating the wind turbine in the autonomous mode of operation, wherein the autonomous mode refers to a mode wherein the wind turbine is isolated from an electrical grid and is configured to operate independently from the electrical grid;
   while operating the wind turbine in the autonomous mode of operation, detecting a safe condition for operating the wind turbine when a predetermined parameter is below a threshold, wherein the predetermined parameter is one or more of: wind speed, an angle of attack, wind turbine loading, wind turbine vibration, or wind turbine acceleration;
   during the safe condition, generating electric power by rotating the wind turbine rotor at a first rotational speed between four (4) and eight (8) revolutions per minute by actively controlling a pitch angle of the plurality of blades while supplying at least part of the generated electric power to at least one wind turbine auxiliary system;
   while still operating the wind turbine in the autonomous mode of operation, detecting a specified condition that endangers the wind turbine, wherein the specified condition that endangers the wind turbine is detected when the predetermined parameter has reached or exceeded the threshold; and
   upon detection of the specified condition that endangers the wind turbine, generating the electric power supplied to the auxiliary system by rotating the wind turbine rotor at a second rotational speed equal to or less than two (2) revolutions per minute.

2. The method of claim 1, wherein the first rotational speed of the rotor is such that a rotation frequency of the rotor is above a natural frequency of the wind turbine tower.

3. The method of claim 2, wherein the second rotational speed of the rotor is such that a rotation frequency of the rotor is below a natural frequency of the wind turbine tower.

4. The method of claim 1, wherein the pitch angle is below 45° when the wind turbine rotor is rotated at the first rotational speed of the rotor, and wherein the pitch angle is above 45° when the wind turbine rotor is rotated at the second rotational speed of the rotor.

5. The method of claim 4, wherein the wind turbine rotor is rotated at the second rotational speed of the rotor by actively controlling the pitch angle.

6. The method of claim 5, wherein the pitch angle is varied at the first and the second rotational speed of the rotor with a proportional gain of a PID control which is lower than a proportional gain of a PID control when the wind turbine is not in autonomous mode.

7. The method of claim 1, wherein the electric power generated when rotating the rotor at the first or the second rotational speed of the rotor is less than 5% of a rated power of the wind turbine.

8. The method of claim 1, wherein the electric power generated when rotating the rotor at the first or the second rotational speed is maintained within a range of a power output setpoint plus or minus a 10% of the power output setpoint.

9. The method of claim 1, wherein rotation of the rotor at the first or the second rotational speed of the rotor is maintained within a range of plus or minus a 10% of a setpoint rotational speed of the rotor.

10. The method of claim 1, further comprising supplying a portion of the generated electric power from the generator to an auxiliary energy storage system.

11. The method of claim 1, wherein the first and the second rotational speeds of the rotor are different from rotor rotational speeds during normal operation of the wind turbine wherein the wind turbine generates and supplies electric power to the electrical grid.

12. A wind turbine comprising a control system configured to carry out the method according to claim 1.

* * * * *